United States Patent
Bhatia et al.

(10) Patent No.: US 12,487,959 B2
(45) Date of Patent: Dec. 2, 2025

(54) ENABLING OUT-OF-BAND GENERIC PCIe SWITCH CONTROL/CONFIGURATION MANAGEMENT USING BMC FOR DYNAMIC, SCALABLE HARDWARE REQUIREMENTS

(71) Applicant: American Megatrends International, LLC, Duluth, GA (US)

(72) Inventors: Anurag Bhatia, Sugar Hill, GA (US); Winston Thangapandian, Suwanee, GA (US); Jason Messer, Fair Play, SC (US); Venkatesan Balakrishnan, Chennai (IN); Pokuri Sivakrishna, Ongole (IN); Valantina Arumugam, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 61 days.

(21) Appl. No.: 18/433,017

(22) Filed: Feb. 5, 2024

(65) Prior Publication Data

US 2025/0252072 A1 Aug. 7, 2025

(51) Int. Cl.
*G06F 13/42* (2006.01)
(52) U.S. Cl.
CPC .. *G06F 13/4221* (2013.01); *G06F 2213/0026* (2013.01)

(58) Field of Classification Search
CPC .................. G06F 13/4221; G06F 2213/0026
See application file for complete search history.

(56) References Cited

U.S. PATENT DOCUMENTS

| | | | |
|---|---|---|---|
| 9,780,960 B2 | 10/2017 | Bidaralli et al. | |
| 10,521,376 B1* | 12/2019 | Mitra | G06F 3/0632 |
| 11,086,813 B1* | 8/2021 | Schuette | G06F 13/4022 |
| 11,321,071 B2 | 5/2022 | Mugunda et al. | |
| 2014/0101653 A1* | 4/2014 | Dharmadhikari | G06F 8/65 717/173 |
| 2017/0091042 A1* | 3/2017 | Chou | G06F 11/1441 |
| 2018/0278468 A1* | 9/2018 | Rao | H04L 41/044 |
| 2019/0377496 A1* | 12/2019 | Olarig | H04L 49/357 |
| 2023/0161726 A1* | 5/2023 | Zhu | G06F 13/4022 710/313 |
| 2023/0205719 A1* | 6/2023 | Zhang | G06F 13/4282 710/316 |
| 2023/0214347 A1* | 7/2023 | Bower, III | G06F 13/4022 710/105 |

* cited by examiner

*Primary Examiner* — Henry Tsai
*Assistant Examiner* — Harry Z Wang
(74) *Attorney, Agent, or Firm* — TROUTMAN PEPPER LOCKE LLP; Tim Tingkang Xia, ESQ.

(57) ABSTRACT

In an aspect of the disclosure, a method, a computer-readable medium, and an apparatus are provided. The apparatus may be a BMC. The BMC receives a management instruction directed to a Peripheral Component Interconnect Express (PCIe) switch. The BMC generates a corresponding command for the PCIe switch based on the management instruction. The BMC transmits the corresponding command to the PCIe switch to configure or operate the PCIe switch dynamically.

16 Claims, 4 Drawing Sheets

ENABLING OUT-OF-BAND GENERIC PCIe SWITCH CONTROL/CONFIGURATION MANAGEMENT USING BMC FOR DYNAMIC, SCALABLE HARDWARE REQUIREMENTS

BACKGROUND

Field

The present disclosure relates generally to computer systems, and more particularly, to techniques of enabling out-of-band generic PCIe switch control/configuration management using BMC for dynamic, scalable hardware requirements.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture. The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a BMC. The BMC receives a management instruction directed to a Peripheral Component Interconnect Express (PCIe) switch. The BMC generates a corresponding command for the PCIe switch based on the management instruction. The BMC transmits the corresponding command to the PCIe switch to configure or operate the PCIe switch dynamically.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
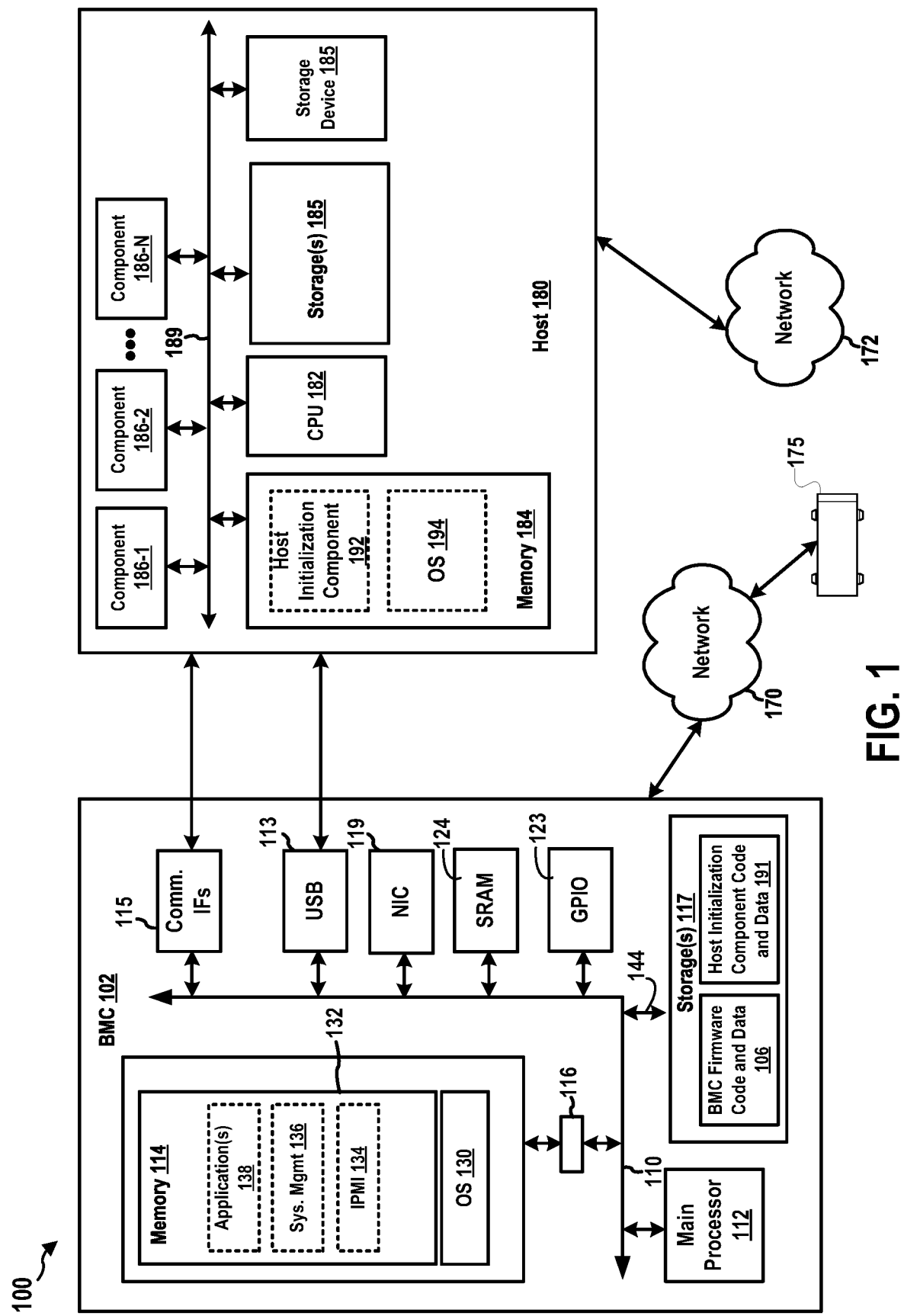
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 an BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170. Further, the storage(s) 117 is in communication with the communication channel 110 through a communication link 144.

Peripheral component interconnect express (PCIe) switching is one of the major requirements in data centers to meet the needs of data-intensive applications and hyperscale computing. In today's digital infrastructure where compute, storage, and network are segregated from each other, and are expected to be configured dynamically as per the real time needs. An unlimited scale up and scale down dynamics is in play when serving these changing requirements for the compute and storage.

PCIe switches are used to interconnect various compute, storage, network, and other devices in the system. The PCIe switch can be configured to create upstream/downstream connections to form required system configuration dynamically. In a typical server setup, PCIe switch configuration is achieved using in-band tools to configure the system at a desired level. This in-band method of configuring PCIe switch cannot be applied in a hyperscale environment like data centers where local system access is unavailable.

Baseboard management controller (BMC) provides an out of band connection into the server for various monitoring and managing activities. By enabling PCIe Switch monitoring, and configuration within the BMC firmware, and offering the same on BMC's out-of-band interfaces (IPMI, Redfish/REST etc.) to the external management software or admins, complete PCIe switch support can be offered remotely. The same interface can be used to keep track of the PCIe switch status from anywhere.

Figure 2:
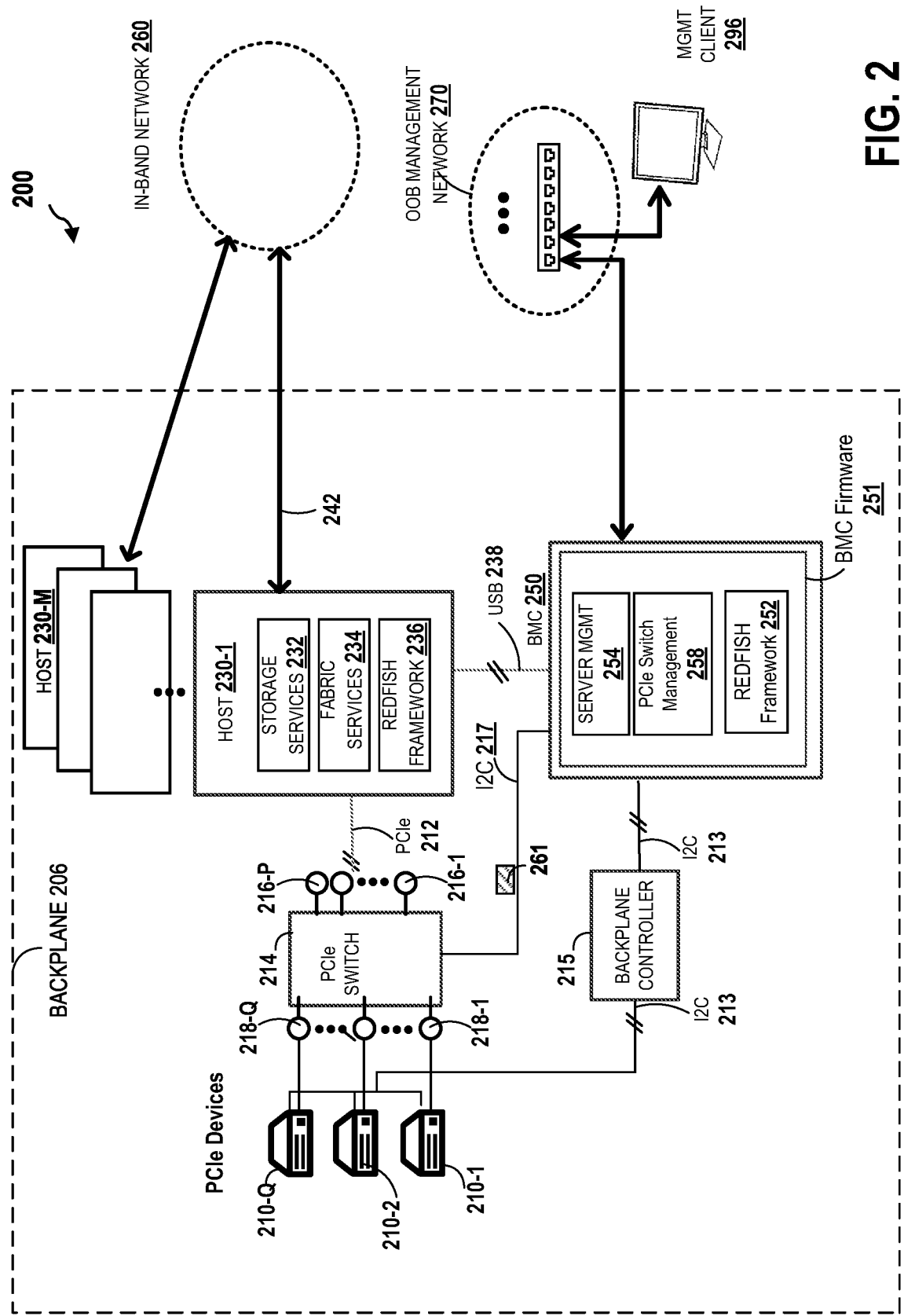
FIG. 2 is a diagram illustrating another computer system.

FIG. 2 is a diagram illustrating a computer system 200. In this example, a backplane 206 hosts host servers 230-1 to 230-M, a BMC 250, a PCIe switch 214, PCIe devices 210-1 ... 210-N, and a backplane controller 215. One or more of the host servers 230-1 to 230-M may be connected to upstream ports 216-1 to 216-P of the PCIe switch 214. Each of the host servers 230-1 to 230-M may be a host computer 180. One or more of the PCIe devices 210-1 ... 210-N may be connected to downstream ports 218-1 to 218-Q of the PCIe switch 214.

In this example, the host server 230-1 is in communication with the PCIe switch 214 through a PCIe link 212. In this example, the host server 230-1 may implement storage services 232, fabric services 234, and a REDFISH framework 236.

In this example, the BMC 250 may be in communication with and/or managing one or more of the host servers 230-1 to 230-M. The BMC 250 may be the BMC 102. Further, the BMC 250 may be connected to the host servers through a LAN over USB link 238 and the communication between the BMC 250 and the host servers may be based on LAN over USB protocols.

Furthermore, BMC firmware 251 of the BMC 250 includes a BMC REDFISH framework 252, a server management component 254, and a PCIe switch management component 258. The BMC 250 is in communication with a client 296 through a management network 270. The BMC 250 may use its out-of-band (OOB) LAN management channel over the management network 270 to also offer PCIe switch manageability over the network.

In one example, a management application on the client 296 may send to the BMC 250 a REDFISH message directed to the PCIe switch management component 258. The REDFISH message contains a PCIe switch management instruction for the PCIe switch management component 258. Upon receiving the REDFISH message at the BMC REDFISH framework 252, a message handler at the BMC REDFISH framework 252 examines the attributes of the message to determine whether the message is intended for the server management component 254 or the PCIe switch management component 258.

In this example, the message handler determines that the message is directed to the PCIe switch management component 258 and, accordingly, forwards the REDFISH message to the PCIe switch management component 258. The PCIe switch management component 258 then may, based on the PCIe switch management instruction, generate a corresponding command 261 for operating or configuring the PCIe switch 214.

In another example, upon receiving the REDFISH message, the BMC REDFISH framework 252 determines that the REDFISH message is directed to the host server 230-1. Accordingly, the BMC REDFISH framework 252 forwards the REDFISH message to the host REDFISH framework 236 on the host server 230-1.

In yet another example, the message handler of the BMC REDFISH framework 252 determines that the REDFISH message is directed to the server management component 254 and, accordingly, forwards the REDFISH message to the server management component 254. The server management component 254 may perform the baseboard management functions described supra regarding the BMC 102 and as specified in IPMI Specifications.

Figure 3:
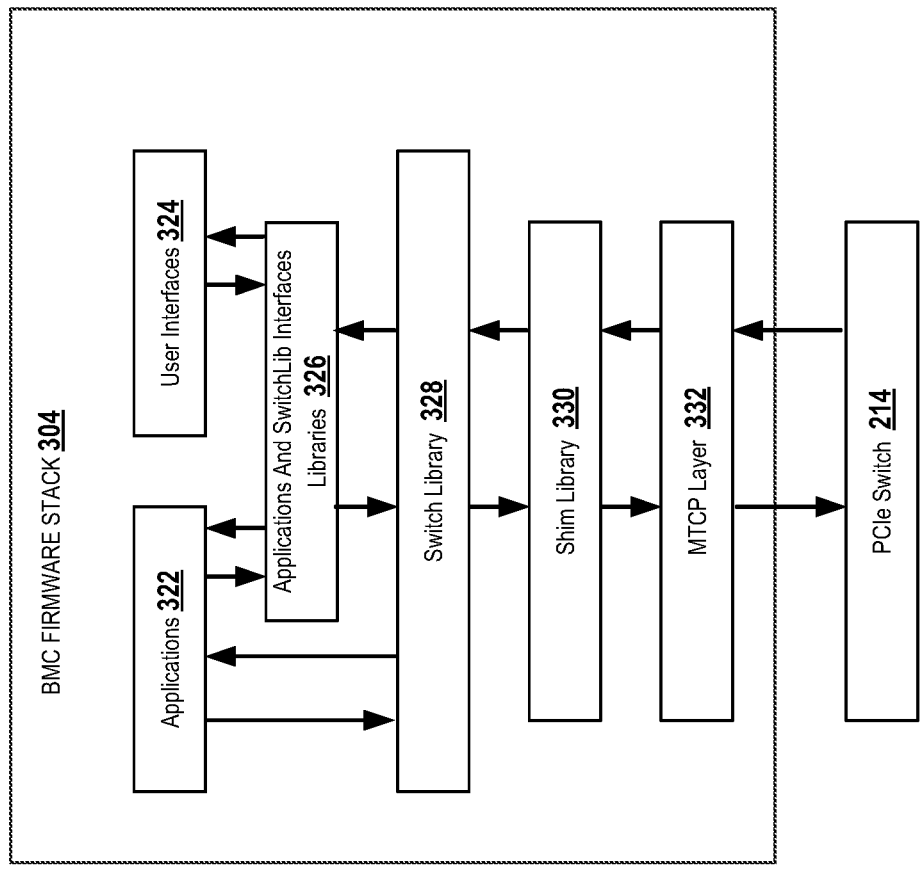
FIG. 3 is a diagram 300 illustrating a BMC firmware stack.

FIG. 3 is a diagram 300 illustrating a BMC firmware stack. In this example, a BMC firmware stack 304 includes the following components:

Applications 322: This component includes the applications that use the BMC firmware stack to access and manage the PCIe switch. Examples of applications include IPMI, Redfish, and a BMC console application.

User Interfaces 324: This component includes the user interfaces that allow users to interact with the BMC firmware stack. Examples of user interfaces include a web-based interface, a command-line interface, and a graphical user interface.

Applications and SwitchLib Interfaces library 326: This component includes the interfaces that allow the applications to interact with the SwitchLib library.

Switch Library 328: This component includes the library that provides an interface between the BMC firmware stack and the PCIe switch.

Shim Library 330: This component includes the library that provides an interface between the SwitchLib library and the MCTP layer.

MCTP Layer 332: This component includes the layer that provides a transport-independent protocol for communication between the BMC firmware stack and the PCIe switch.

The PCIe switch 214 is a component that allows interconnection of various compute, storage, network, and other PCIe devices in the system. PCIe switches are present in most modern server boards and are starting to implement advanced management features that allow the switch itself to be monitored and configured.

The PCIe switch 214 contains multiple upstream ports 216-1 to 216-P and multiple downstream ports 218-1 to 218-Q. The upstream ports connect to host servers 230-1 to 230-M, which can be host computers like the host computer 180. The downstream ports connect to PCIe devices 210-1 to 210-N, such as NVMe drives, GPUs, etc.

A key capability offered by the PCIe switch 214 is the ability to dynamically connect downstream ports to different upstream ports under software control. This allows PCIe devices connected to the downstream ports to be shared among multiple host servers connected to the upstream ports. For example, a bank of NVMe drives could be provisioned to different servers in a data center as needed.

The PCIe switch 214 acts as the controller for the PCI Express bus and all transactions to downstream PCIe devices flow through it. The switch 214 provides advanced telemetry, monitoring, and configuration capabilities that allow software to actively manage PCIe fabric topology and diagnose issues.

To enable dynamic management of the PCIe switch 214 fabric, the BMC firmware stack 304 implements the PCIe switch management component 258. More specifically, the applications 322 component contains the PCIe switch management component 258 as well as Redfish, IPMI, and other applications that can access the switch management functions through the applications and switchlib interfaces libraries 326. This allows data center administrators to remotely monitor and configure the PCIe switch 214 in an out-of-band manner via the PCIe switch management component 258, without needing local access to host servers.

The switch library 328, shim library 330, and MCTP layer 332 implement the protocols and interfaces necessary for the PCIe switch management component 258 to communicate with and control the PCIe switch hardware.

The switch library 328 is provided by the hardware vendor, while the shim library 330 and MCTP layer 332 are components used to enable BMC-based control. The switch library 328 provides a SwitchLib API, which is a library of commands, that enables software to interface with and control the switch hardware. The switch library 328 allows applications to receive information about the PCIe switch 214 topology, query attributes of the various ports, and configure the downstream to upstream port mappings dynamically. The switch library 328 contains the actual logic to generate PCIe switch configuration and management commands that can be understood by the switch hardware.

The switch library 328 interacts with the PCIe switch 214 using an MCTP communication protocol provided by the MCTP layer 332. MCTP provides a transport-agnostic layer for sending control messages between management controllers and endpoints. In this case, the BMC 250 running the firmware stack 304 acts as the management controller, while the PCIe switch 214 is the endpoint.

To enable communication between the vendor-provided switch library 328 and the MCTP layer 332, the shim library 330 provides the necessary translation logic. The shim library 330 converts API calls of the switch library 328 to the underlying MCTP protocol commands and responses.

The applications 322, through the applications and switchlib interfaces library 326, utilizes the API of the switch library 328 for communicating over MCTP channels to the PCIe switch 214 hardware. As such, the PCIe switch management component 258 leverages this mechanism to implement out-of-band remote management capabilities. Enabling PCIe switch management from the BMC provides administrators increased visibility into PCIe fabric topology and allows dynamic reconfiguration as needed, improving efficiency and scalability. The out-of-band nature of the BMC allows switch management independently of the status or availability of host servers.

During initialization, the MCTP layer 332 in the BMC firmware stack 304 performs endpoint assignment and discovery for any connected PCIe switches, such as the PCIe switch 214. The MCTP layer 332 assigns a unique endpoint ID to each detected PCIe switch.

Along with the endpoint ID, the MCTP layer 332 also discovers basic information about each PCIe switch device, including the connection interface, PCI bus number, and supported message types (e.g. PLDM, NC-Si). This endpoint assignment and discovery process allows the BMC firmware stack 304 to identify and communicate with one or more PCIe switches for management purposes.

The assigned endpoint ID handles all subsequent requests and responses between the BMC firmware stack 304 and the corresponding PCIe switch. Having a unique ID assigned to each switch provides scalability to manage multiple PCIe switches from the same BMC 250.

After endpoint assignment, the applications 322, such as IPMI, Redfish, and the BMC console application, can leverage the user interfaces 324 to allow an administrator to monitor and configure the PCIe switch 214.

Specifically, the administrator can view PCIe switch status and telemetry data like temperature, firmware version, error logs, etc. provided by the switch library 328 through its interaction with the underlying hardware.

Additionally, the administrator can configure PCIe switch parameters such as assigning/unassigning downstream ports 218-1 to 218-Q to upstream ports 216-1 to 216-P. This enables dynamic control of the PCIe fabric topology, redirecting PCIe devices connected downstream to different host servers 230-1 to 230-M upstream.

The switch library 328 contains the necessary logic to generate appropriate PCIe switch configuration and management commands. These commands are sent to the PCIe switch 214 via the MCTP layer 332 using the endpoint ID assigned during initialization.

By performing switch monitoring and configuration through the out-of-band BMC firmware stack 304 rather than in-band through a host, administrators gain improved remote visibility and management capability. Enabled through components like the PCIe switch management component 258, switch management via BMC operates independently of host server status or accessibility.

As shown in FIG. 2, the PCIe switch 214 contains multiple upstream ports 216-1 to 216-P connected to one or more of the host servers 230-1 to 230-M, and multiple downstream ports 218-1 to 218-Q connected to one or more of the PCIe devices 210-1 to 210-N. The PCIe switch management component 258 allows administrators to remotely monitor and configure PCIe switch 214 topology in an out-of-band manner via the user interfaces 324 such as a web-based interface.

As an example, through the web interface an administrator can view the PCIe switch 214 layout and topology. The user interface displays information such as:

Number of downstream ports 218-1 to 218-Q and upstream ports 216-1 to 216-P
Port types (upstream or downstream)
Firmware version
Temperature sensors
Chip IDs This information is retrieved from the PCIe switch 214 hardware using the switch library 328 component, which leverages the MCTP layer 332 to communicate with the switch 214. The switch library 328 essentially acts as a middleware between the application layer and the hardware, providing a SwitchLib API to query information about ports, register values, etc.

Furthermore, the administrator can configure dynamic associations between downstream ports 218-1 to 218-Q and upstream ports 216-1 to 216-P. For example, initially the downstream port 218-1 connects to the PCIe device 210-1 (e.g., a NVMe drive), and is currently assigned to the upstream port 216-1, which connects to the host server 230-1. Subsequently, the administrator may reassign the downstream port 218-1 to the upstream port 216-2, which connects to the host server 230-2. As such, the PCIe device 210-1 is changed from being connected to the host server 230-1 to being connected to the host server 230-2.

This reroutes the PCIe device's connection from one host server to another. The switch library 328 contains the necessary logic to generate appropriate PCIe switch configuration commands to change the downstream to upstream mapping. These commands propagate down the stack through the shim library 330 and MCTP layer 332, before finally reaching the PCIe switch 214 endpoint.

By leveraging the out-of-band BMC firmware stack 304 for switch management, administrators gain dynamic control over PCIe fabric topology without needing access to host servers themselves. The applications 322 and user interfaces 324 enable seamless interaction with the switch 214 through the switch library 328 and underlying communication protocol.

In addition to monitoring topology and dynamic port mapping, the PCIe switch management component 258 may also allow administrators to configure other aspects of the PCIe switch 214:

Clear error bits—The switch library 328 API can clear sticky error bits in PCIe switch registers by generating appropriate clear commands. Common errors include parity errors, header log overflows, etc.

Update firmware—New PCIe switch firmware versions can be installed to patch bugs or provide new functionality. The switch library 328 allows firmware images to be sent to the PCIe switch 214 via BMC-based protocols like MCTP.

Enable/disable ports—Individual downstream ports 218-1 to 218-Q or upstream ports 216-1 to 216-P can be administratively enabled/disabled as needed. Disabling unused ports can improve power savings.

Performance monitoring—The switch exposes low-level performance counters tracking metrics like clock ratios, error counts, etc. This helps administrators monitor PCIe fabric health.

The applications 322 also allow administrators to configure PCIe switch parameters via the user interfaces 324. One such example is erasing RAM errors. During normal operation, the PCIe switch 214 hardware may log errors into RAM based registers. These RAM errors can provide useful diagnostics to identify issues with the PCIe fabric.

To clear these logged errors, the administrator can use the PCIe switch management component 258 to send a command. This command propagates down the firmware stack 304 through the switch library 328 and underlying MCTP layer 332 before reaching the PCIe switch 214. The switch 214 hardware then performs the necessary steps to erase the RAM errors per the specification. Clearing historical errors can assist with troubleshooting intermittent or transient issues in the system. The switch library 328 contains the required logic to format the instruction correctly to the switch 214.

These additional configuration parameters further improve administrators' visibility into switch operation and provide knobs for tuning performance or reliability. The switch library 328 implements support for manipulating these parameters through well-defined APIs.

Figure 4:
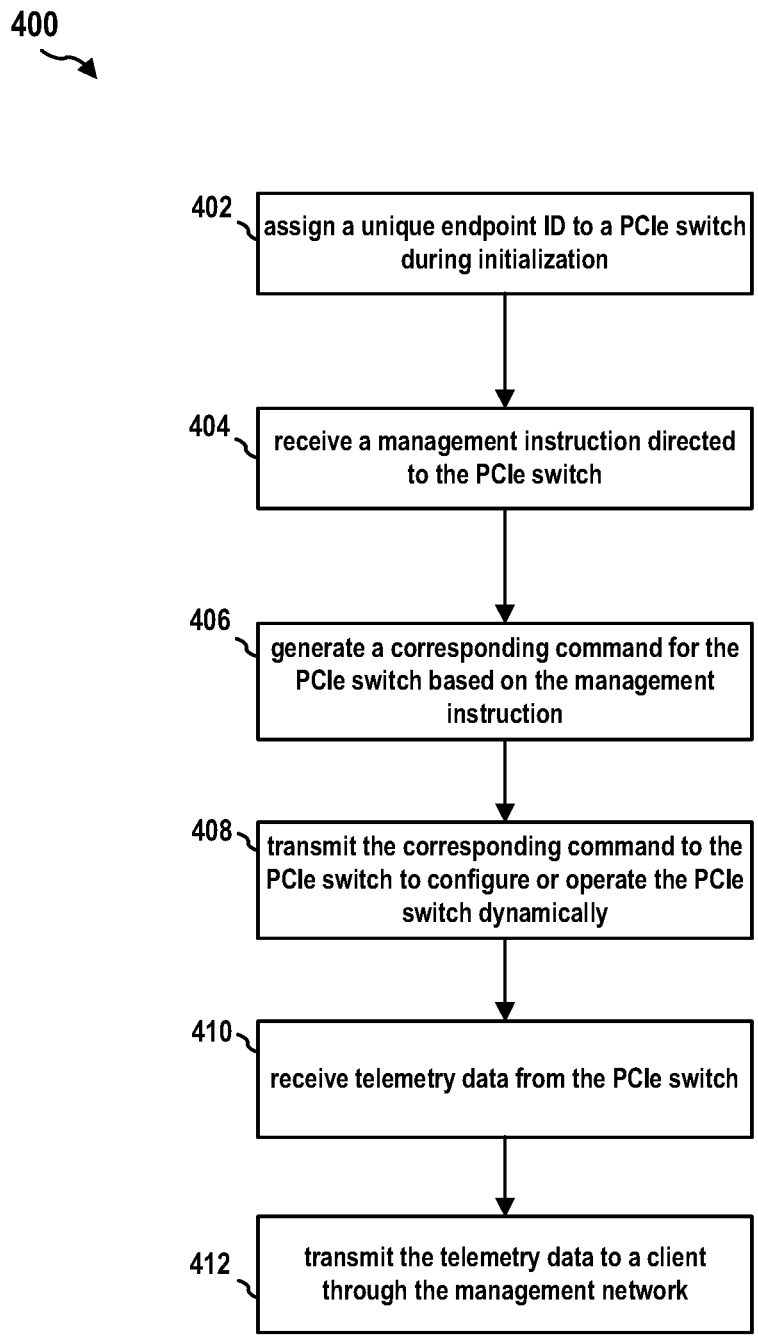
FIG. 4 is a flow chart of a method for operating a BMC to manage a PCIe switch.

FIG. 4 is a flow chart 400 of a method for operating a baseboard management controller (BMC) to manage a PCIe switch. The method may be performed by a BMC (e.g., the BMC 250). In operation 402, the BMC assigns a unique endpoint ID to a PCIe switch during initialization. The BMC also maintains basic information of the PCIe switch including at least one of a connection interface, a PCI bus number, and supported message types.

In operation 404, the BMC receives a management instruction directed to the PCIe switch (e.g., the PCIe switch 214). In operation 406, the BMC generates a corresponding command for the PCIe switch based on the management instruction. In certain configurations, to generate the corresponding command for the PCIe switch, the BMC utilizes a switch library (e.g., the switch library 328) provided by a hardware vendor of the PCIe switch.

In operation 408, the BMC transmits the corresponding command to the PCIe switch to configure or operate the PCIe switch dynamically. In certain configurations, the BMC utilizes a shim library (e.g., the shim library 330) to interface between the switch library and a Management Component Transport Protocol (MCTP) layer (e.g., the MCTP layer 332) implemented on the BMC. The MCTP layer provides an interface for communicating with the PCIe switch. The corresponding command is transmitted to the PCIe switch via the MCTP layer.

In certain configurations, the management instruction is received from a client (e.g., the client 296) through a management network (e.g., the management network 270) utilizing an out-of-band (OOB) LAN management channel. In certain configurations, the management instruction is received through a REDFISH message via the BMC REDFISH framework (e.g., BMC REDFISH framework 252). In certain configurations, the management instruction is received via a web-based interface accessible to remotely configure the PCIe switch in an out-of-band manner.

In certain configurations, the management instruction relates to monitoring health and statistics of the PCIe switch, including temperature, firmware version, and error logs of the PCIe switch. In certain configurations, the management instruction relates to configuring an association between a downstream port of the PCIe switch and an upstream port of the PCIe switch to reroute a peripheral device connected to the downstream port to a different host system connected to the upstream port. In certain configurations, the management instruction relates to updating firmware of the PCIe switch, enabling or disabling ports of the PCIe switch, clearing error bits, or accessing performance counters of the PCIe switch.

In certain configurations, in operation 410, the BMC receives telemetry data from the PCIe switch. In operation 412, the BMC transmits the telemetry data to a client through the management network.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:
   receiving, by the BMC, a management instruction directed to a Peripheral Component Interconnect Express (PCIe) switch;
   generating a corresponding command for the PCIe switch based on the management instruction by utilizing a switch library provided by a hardware vendor of the PCIe switch;
   utilizing a shim library to interface between the switch library and a Management Component Transport Protocol (MCTP) layer implemented on the BMC, wherein the MCTP layer provides an interface for communicating with the PCIe switch; and
   transmitting the corresponding command to the PCIe switch to configure or operate the PCIe switch dynamically.

2. The method of claim 1, further comprising:
   assigning, by the BMC during initialization, a unique endpoint ID to the PCIe switch; and
   maintaining, by the BMC, basic information of the PCIe switch including at least one of a connection interface, a PCI bus number, and supported message types.

3. The method of claim 1, wherein the corresponding command is transmitted to the PCIe switch via the MCTP layer.

4. The method of claim 1, wherein the management instruction is received from a client through a management network utilizing an out-of-band (OOB) LAN management channel.

5. The method of claim 1, wherein the management instruction is received through a REDFISH message.

6. The method of claim 1, wherein the management instruction is received via a web-based interface accessible to remotely configure the PCIe switch in an out-of-band manner.

7. The method of claim 1, wherein the management instruction relates to monitoring health and statistics of the PCIe switch, including temperature, firmware version, and error logs of the PCIe switch.

8. The method of claim 1, wherein the management instruction relates to configuring an association between a downstream port of the PCIe switch and an upstream port of the PCIe switch to reroute a peripheral device connected to the downstream port to a different host system connected to the upstream port.

9. The method of claim 1, wherein the management instruction relates to updating firmware of the PCIe switch, enabling or disabling ports of the PCIe switch, clearing error bits, or accessing performance counters of the PCIe switch.

10. The method of claim 1, further comprising:
    receiving, by the BMC, telemetry data from the PCIe switch; and
    transmitting the telemetry data to a client through the management network.

11. A baseboard management controller (BMC), comprising:
    a memory; and
    at least one processor coupled to the memory and configured to:
        receive a management instruction directed to a Peripheral Component Interconnect Express (PCIe) switch;
        generate a corresponding command for the PCIe switch based on the management instruction by utilizing a switch library provided by a hardware vendor of the PCIe switch;

utilize a shim library to interface between the switch library and a Management Component Transport Protocol (MCTP) layer implemented on the BMC, wherein the MCTP layer provides an interface for communicating with the PCIe switch; and transmit the corresponding command to the PCIe switch to configure or operate the PCIe switch dynamically.

12. The BMC of claim 11, wherein the at least one processor is further configured to:

assign, during initialization, a unique endpoint ID to the PCIe switch; and maintain basic information of the PCIe switch including at least one of a connection interface, a PCI bus number, and supported message types.

13. The BMC of claim 11, wherein the corresponding command is transmitted to the PCIe switch via the MCTP layer.

14. The BMC of claim 11, wherein the management instruction is received from a client through a management network utilizing an out-of-band (OOB) LAN management channel.

15. The BMC of claim 11, wherein the management instruction is received through a REDFISH message.

16. A non-transitory computer-readable medium storing computer executable code for operating a baseboard management controller (BMC), comprising code to:

receive a management instruction directed to a Peripheral Component Interconnect Express (PCIe) switch;

generate a corresponding command for the PCIe switch based on the management instruction by utilizing a switch library provided by a hardware vendor of the PCIe switch;

utilize a shim library to interface between the switch library and a Management Component Transport Protocol (MCTP) layer implemented on the BMC, wherein the MCTP layer provides an interface for communicating with the PCIe switch; and transmit the corresponding command to the PCIe switch to configure or operate the PCIe switch dynamically.

* * * * *